United States Patent
Fan et al.

(10) Patent No.: US 7,574,606 B1
(45) Date of Patent: Aug. 11, 2009

(54) LOCATION AUTHENTICATION STAMP ATTACHED TO MESSAGES

(75) Inventors: Carey B. Fan, Fremont, CA (US);
Kulbir S. Sandhu, Fremont, CA (US);
Kenny Man D Nguyen, Mountain View, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 648 days.

(21) Appl. No.: 09/696,446

(22) Filed: Oct. 24, 2000

(51) Int. Cl.
*G06F 21/00* (2006.01)
(52) U.S. Cl. ...................................... 713/179
(58) Field of Classification Search ................ 713/175, 713/179; 380/258
See application file for complete search history.

(56) References Cited

U.S. PATENT DOCUMENTS

| 5,757,916 A | * | 5/1998 | MacDoran et al. .......... 380/258 |
| 5,959,577 A | | 9/1999 | Fan et al. ................ 342/357.13 |
| 5,990,827 A | | 11/1999 | Fan et al. ............... 342/357.11 |
| 6,067,529 A | * | 5/2000 | Ray et al. ...................... 705/26 |
| 6,240,360 B1 | * | 5/2001 | Phelan ........................ 701/208 |
| 6,456,854 B1 | * | 9/2002 | Chern et al. ................. 455/457 |
| 6,687,504 B1 | * | 2/2004 | Raith ....................... 455/456.1 |
| 6,829,230 B1 | * | 12/2004 | Tiuri ........................... 370/351 |

* cited by examiner

*Primary Examiner*—Andrew L Nalven

(57) ABSTRACT

A location stamp automatically attached to messages indicates location information such as longitude and latitude information from a GPS device. The location stamp helps a receiver to identify the location of the sender or a transaction, identify the sender, and provides context to the message that further indicates the messages meaning. Applications of the location stamp include authentication of the location of a sender or a transaction and identifying the location of a sender for a search and rescue.

19 Claims, 3 Drawing Sheets

US 7,574,606 B1

LOCATION AUTHENTICATION STAMP ATTACHED TO MESSAGES

BACKGROUND

A receiver of an electronic message often needs to identify the sender of the message. Conventionally, a name or an IP address is automatically attached to such messages to aid the receiver in identifying the sender. However, the receiver generally needs to ask the sender for other information such as the location of the sender. The receiver then depends on the sender to reply with accurate information. Requesting information can delay further communications and can result in inaccurate information being sent when the sender does not know the requested information, makes an error in the reply conveying the information, or is deceptive in the reply.

In a separate area of technology, locating devices such as the global positioning satellite (GPS) systems and triangulation systems have developed to a point where a relatively inexpensive device can accurately and quickly determine the device's current location. Such locating devices have been wedded to communication systems. For example, U.S. Pat. No. 5,959,577 describes a system that transmits location information on a wireless network and tracks mobile units such as delivery vehicles. In such systems, a base station can request location information from a mobile unit or the mobile unit can send location information either periodically or when the mobile unit determines that the criterion for message transmission are met. Such systems generally send location information in the payload of message and only when requested.

SUMMARY

In accordance with the invention, a sending device automatically attaches a location stamp to all transmitted messages. The location stamp indicates a location of the sender and contains, for example, longitude and latitude information from a GPS device or other locating device. Accordingly, a receiver can identify the location of the sender, which helps the receiver understand the context of the message and authenticate the sender's identity and/or the location of a transaction. For example, when completing a delivery, the deliverer can transmit or record a message bearing a location stamp. The location stamp documents that a delivery occurred at a specific location. The location stamp can also identify where a party using a credit card or other account authorized payment for a delivery.

In accordance with another embodiment of the invention, a system for monitoring the performance and operation of vehicles in the field can employ location stamps in messages relaying data describing vehicle operation. The location stamp and a time stamp can indicate the location and time of a breakdown or problem in a vehicle. Accordingly, a quality control analysis of the data can determine whether a particular problem occurs under specific weather or road conditions. A series of such messages transmitted from a vehicle such as a delivery truck provides a record of the route taken by the mobile unit. This route information can identify or prove a source of freight damage for insurance claims or prove that the mobile unit took a safe route for the freight being delivered.

One specific embodiment of the invention is a messaging method that includes generating messages and automatically attaching a location stamp to each message before transmission. The message can consist of one or more data packet where the packet format includes a location stamp. The location stamp is attached and included in the message without user intervention so that communications accurately reflects the location of the sender but is not delayed by requests for location information. A locating device provides location information for automatic generation of the location stamp. The locating device can be part of the sending device or a separate system that the sending device accesses before sending a message. If the sending device is mobile, the locating device can be a GPS device, a triangulation system, or any system for identifying a location. If the sending device is fixed, the location information can be from a configuration register or other memory. The message to which the location stamp is attached is generally a user-generated message that can include text, voice, or image data in the message payload. The location stamp can be decoded at the receiver or in an intermediate processing center that converts the message and location stamp into a format suitable for the receiver.

Another embodiment of the invention is a communication system including a transmitter, a locating device, and a control unit. For each message transmitted from the transmitter, the control unit receives location information from the locating device and automatically attaches a location stamp to the message. In one variation of this embodiment, the transmitter, the locating device, and the control unit are part of an integrated mobile unit. In another variation, the transmitter and the control unit are separate from the locating device and communicate with the locating device to obtain location information before sending a message.

DETAILED DESCRIPTION

In accordance with an aspect of the invention, a transmitter automatically incorporates a location stamp in each message that the transmitter sends. A receiver of the message can use the location stamp in a variety of ways. In particular, uses of the location stamp include but are not limited to: locating the sender for a rescue, delivery, or pickup; tracking movement or the route of the sender; helping confirm the identity of the sender; and confirming that a transaction such as a delivery or charge authorization associated with the message is or was at the correct location. The automatic location stamp also provides proof of actions such as delivery or credit authorization at a particular location.

Figure 1:
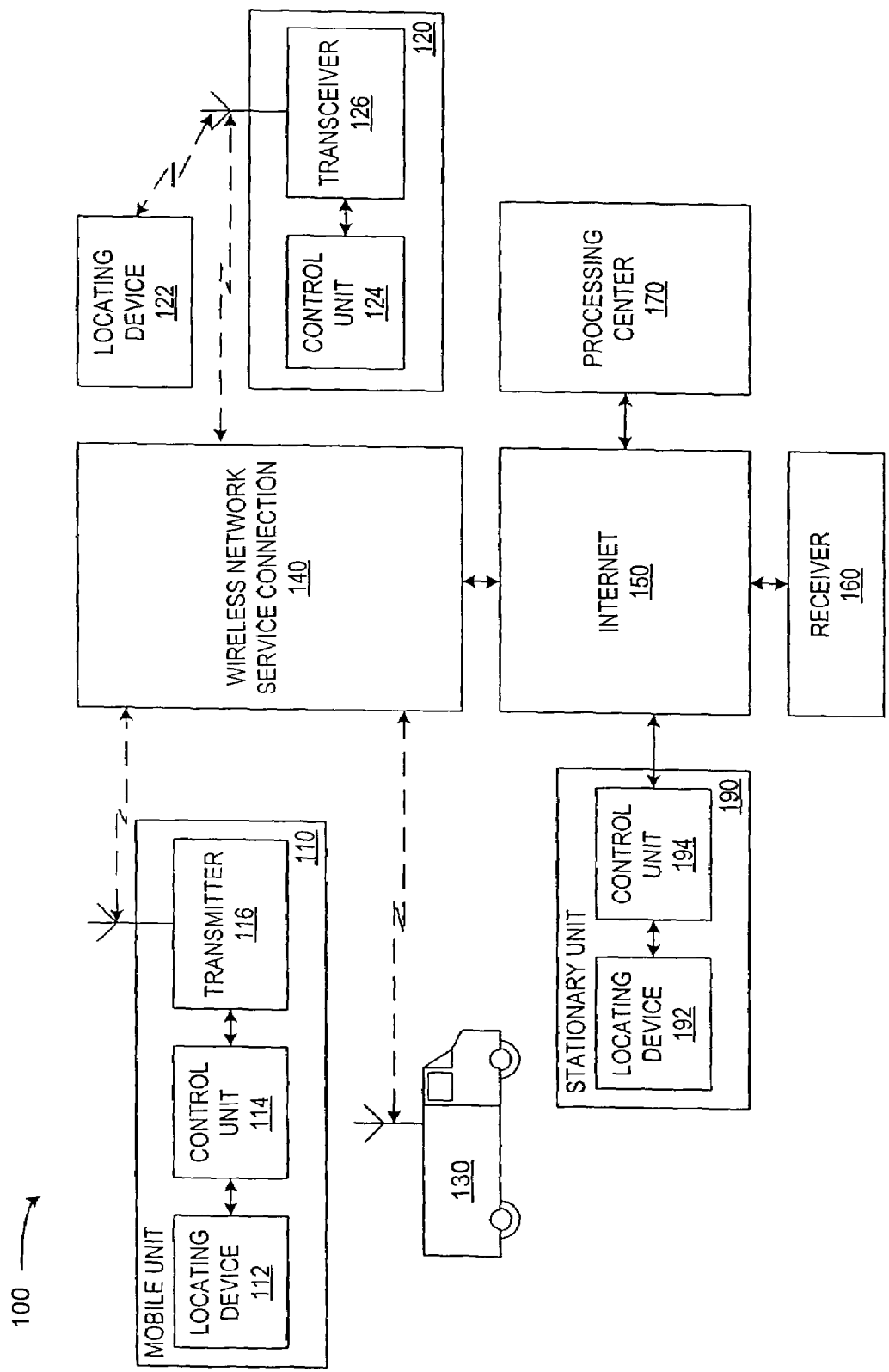
FIG. 1 shows a block diagram of a system in accordance with an embodiment of the invention.

FIG. 1 illustrates a system 100 in accordance with an embodiment of the invention. System 100 includes mobile units 110, 120, and 130 and a stationary unit 190 that communicate with a receiver 160 via a wireless network 140, the Internet 150, and a processing center 170. Mobile unit 110 and 120 are handheld units based on a device such as a wireless telephone, a personal digital assistant (PDA), or a portable computer. Mobile unit 130 is substantially the same as mobile unit 110 or 120 but is mounted in a vehicle such as a private automobile, a taxi, a delivery van, an ambulance, a patrol car, or another emergency vehicle. In one embodiment of the invention, each of mobile units 110 and 130 includes a communications package such as the iLM 2000 available from @Road, Inc., which is upgraded to include instant messaging software performing a messaging process such as described below. Stationary unit 190 is a fixed communication system such as a server, a fixed computer, or other telecommunication device connected (directly or indirectly) to the Internet 150. Receiver 160 can be a mobile or fixed unit such as devices 110, 120, 130, or 190 or a conventional communication device that does not attach a location stamp to transmitted messages.

In the embodiment of FIG. 1, mobile unit 110 includes a locating device 112, a control unit 114, and a transmitter 116. Locating device 112 is source of information identifying the current location of mobile unit 110. In an exemplary embodiment of the invention, locating device 112 is a global positioning satellite (GPS) device that receives signals from a satellite system (not shown) and from those signals determines a longitude and latitude of mobile unit 110. Alternatively, locating device can use alternative technology for determining the location of mobile unit 110. Some of the location-identification methods currently in use include time difference of arrival (TDOA), angle of arrival (AOA), ray tracing/pattern recognition, and hybrid methods for locating a mobile unit using network connections. Another location-identification method (other than GPS methods) that can be implemented in a handset is based on CDMA (code division multiple access) using multiple pseudo-number pilots at the mobile unit. Co-owned U.S. patent application Ser. No. 09/599,053, filed Jun. 21, 2000, entitled "Dual Platform Location-Relevant Service" further describes location-identification technology and is hereby incorporated in its entirety.

Transmitter 116 is typically a transceiver such as a wireless telephone or wireless modem compatible with wireless network service connection 140, but alternative embodiment of the invention include mobile units that are only able to transmit messages. Wireless network 140 is a commercial service such as a CDPD, iDEN, DOPA, GSM, AMPS, or GPRS network that receives the transmissions from mobile units 110, 120, and 130 and relays the messages via the Internet 150 to receiver 160 either directly or via processing center 170. Alternative embodiments of the invention are not limited to internet-based networks but can employ any data network. Generally, the network connection needs to have data capabilities for the location stamp, which is typically digital data, but can transfer any sort of payload in analog or digital formats.

Control unit 114 connects to transmitter 116 and locating device 112. In one embodiment of the invention, control unit 114 contains a microprocessor or microcontroller and a user interface such as buttons, a touch pad, a keyboard, a microphone, a speaker, a still or video camera, activity lights, and a display depending on the characteristics of mobile unit 110. A user operating control unit 114 or software that control unit 114 executes selects a message such as a text, voice, image, or general data to be transmitted to receiver 160. For each message transmitted, control unit 114 automatically retrieves location information from locating device 112 and attaches a location stamp to the message that transmitter 110 transmits.

Mobile unit 120 includes a control unit 124 and a transceiver 126. Transceiver 126 can communicate with wireless network service connection 140 for sending messages to receiver 160 and with a locating device 122 to retrieve location information. Mobile unit 120 differs from mobile unit 110 in that the locating device 122 (unlike locating device 112) is not attached to mobile unit 120. Accordingly, mobile unit 120 can be moved away from locating device 122. In one embodiment of the invention, locating device 122 is attached to a vehicle and mobile device 120 is handheld device that a user can move and use away from the vehicle. In another embodiment of the invention, locating device 122 is part of or communicates with mobile unit 120 through wireless network service connection 140.

When mobile unit 120 is going to send a message to receiver 160, control unit 124 automatically directs transceiver 126 obtain location information from locating device 122. Transceiver 126 inquires regarding a location or otherwise determines the location from locating device 122, and relays the location information to control unit 124. In alternative embodiments, the location information indicates the location of mobile unit 120 or the location of locating device 122. Control unit 124 then processes the location information from locating device 122 and inserts a location stamp in the overhead of the message. Transceiver 126 then transmits the message including the message content and the overhead containing the location stamp.

A location stamp can also be attached to messages from a stationary unit such as stationary unit 190. Stationary unit 190 is a device such as a computer or a server that includes a control unit 194 (e.g., messaging software) and a locating device 192. Stationary unit 190 has a fixed location. Accordingly, locating device 192 can be a data field or a register that is configured to contain the location information for stationary unit 190. The locating device can be initialized when setting up stationary unit 190. Alternatively, locating device 192 can be the same as locating device 112 or 122 and determine the location of stationary unit 190 when necessary for each message. Control unit 194 automatically attaches a location stamp based on information from locating device 192, to each message sent from stationary unit 190.

In an exemplary embodiment of the invention, the location stamp is a code incorporated in each message. The location code can indicate: longitude and latitude values such as from a GPS system; relative geographic information such as the distance and direction from a particular landmark; descriptive information such as an address or room number, or network information such as the connection of the sender in a network. Receiver 160 may be able to use the location code in the transmitted form, but different receivers may require different location information. Usually, processing of the location code is required. Such processing can include geo-decoding or other conversion to generate the information of interest from the location stamp. Receiver 160 may be interested, for example, in the longitude and latitude of the sender; the country, state, postal code, street address, or room number of the sender; or the distance between the sender and some landmark. Additionally, data processing center 170 can format the location information as voice, image, or data signals that receiver 160 can interpret.

In the illustrate embodiment of the invention, processing center 170 intercepts the message including the location stamp and converts the location stamp into a form suitable for receiver 160. In the conversion, center 170 processes the location stamp and potentially other side information according to the application of system 100 and the capabilities of receiver 160. Alternatively, receiver 160 can process a location stamp and processing center 170 is not required. In other embodiments, network infrastructure that transfers the message or a server or service to which receivers 160 connects can process the location stamp before receiver 160 receives the message.

Additionally, center 170 can format the location information for receiver 160 and/or make the location information part of the message payload sent to receiver 160. For example, if receiver 160 is a voice only telephone, processing center 170 can determine an address from location stamp and generate a voice message or a caller-ID message indicating the address. If receiver 160 is a computer, center 170 can convert the location stamp into a location description of the sender and insert the location description in the subject line, a location line, or the body text of a message. The appendix contains a listing of a program that an exemplary embodiment of data processing center 170 executes.

In one embodiment of the invention, system 100 monitors a fleet of vehicles such as taxis or pick-up/delivery vehicles. In this application, mobile unit 110, 120, and 130 can send messages to receiver 160 when requesting a next destination, reaching a destination, or receiving a credit authorization. Mobile unit 130 can also periodically transmit vehicle data such as gas or other fluid levels, engine temperature, and oil pressure to describe the operation of the vehicle. Mobile units 110, 120, and 130 may also be capable general communications such as instant messaging.

In a fleet monitoring system, the location stamps have a variety of uses. When mobile unit 110 or 130 requests a destination, receiver 160 can compare the request's location stamp to a list of destinations and can select a location based on the distance between the destination and the mobile unit. When a vehicle sends a message indicating arrival at a destination, receiver 160 can confirm arrival at the correct location. When mobile unit 110 or 130 receives and transmits a credit card authorization, receiver 160 can confirm that the authorizer's location corresponds to a location associated with the credit card and can record the location information with a transaction as proof that the transaction was authorized.

When mobile unit 130 transmits operating data to indicate how the vehicle is operating, receiver 160 can use the location stamp to determine road and/or whether conditions affecting the vehicle or cargo. In the case of an insurance claim against a carrier, the location stamps for all of the messages from a vehicle can prove whether a vehicle took too long to deliver perishables or took a rough road that may have damaged fragile goods. An automated system can use the location stamps to identify when a vehicle breaks down or is in an accident (if the vehicle does not move for a period of time) or is stolen (if a vehicle moves outside an area in which the vehicle is expected to stay).

In addition to commercial uses, location stamps also have non-commercial benefits. For example, a location stamp allows one to quickly provide their current location to another. This can be particularly important during emergency situations whether a person calling is calling for help, from a stationary or mobile transmitter. In a similar manner, location stamps can be incorporated in communications from law enforcement officers or safety personnel. For example, a police station can verify the locations of incidents when officers call into the station, for example, each time a police officer stops a vehicle and sends a license plate number to the station.

Figure 2:
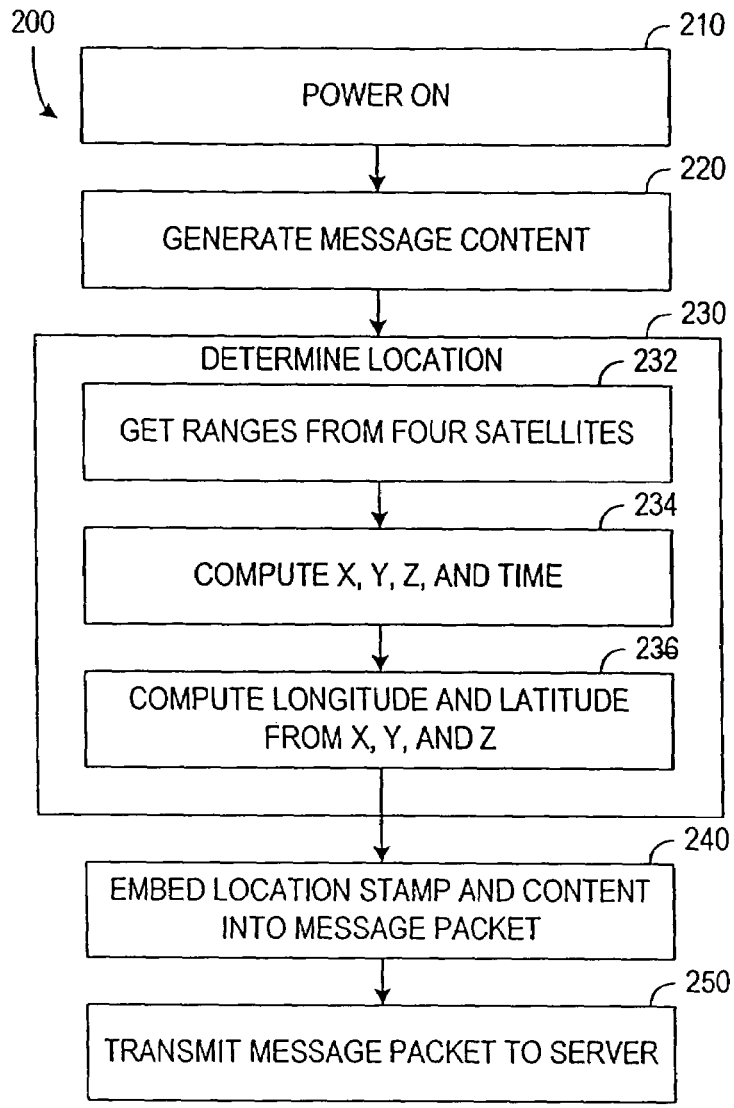
FIG. 2 is a flow diagram of sender's operation for an instant messaging process in accordance with an embodiment of the invention.
Figure 4:
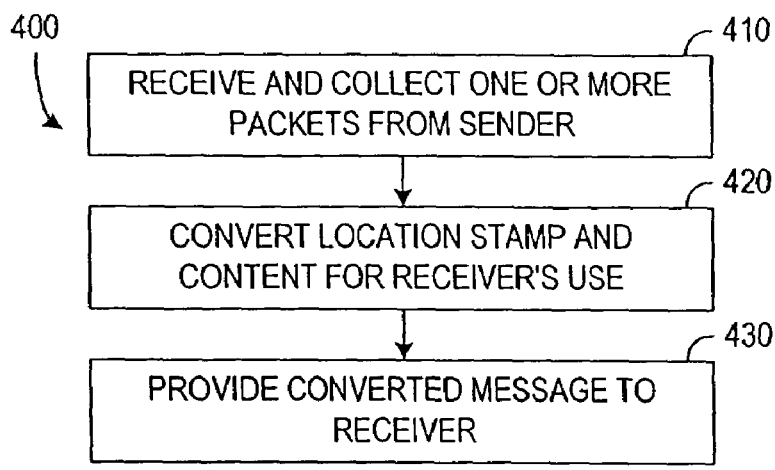
FIG. 4 is a block diagram of a data packet used in an instant messaging process in accordance with an embodiment of the invention.

FIG. 2 is a flow diagram of an instant messaging process 200 implemented by a sending unit such as unit 110, 120, 130, or 190 of FIG. 1. In a step 220, which is after the sending unit powers up in step 210, a user or software executed in the sending unit generates the content of a message. The sending unit then automatically determines location information in a step 230. For example, a GPS system gets ranges from satellite signals (step 232), computes coordinates X, Y, and Z from the satellite signals (step 234), and computes the longitude and latitude of the sending unit (step 236). In this case, the location stamp contains the longitude and latitude values. The sending unit embeds the location stamp and the message content in a message packet having a format such as shown in FIG. 4 and transmits the message packet. Generally, the message packet can be directed directly to the receiver, but in process 200, the sending unit transmits the message packet to a server of a processing center (e.g., processing center 170 of FIG. 1).

Figure 3:
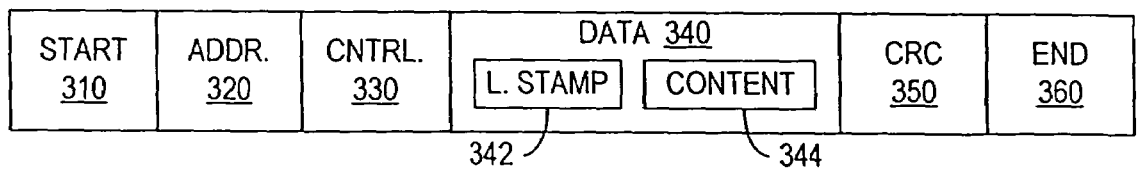
FIG. 3 is a flow diagram of a server's operation for an instant messaging process in accordance with an embodiment of the invention.

FIG. 3 shows a typical packet format. The wireless network conducting the message packet between the sending unit and the processing center requires a particular packet format. In the format of FIG. 3, the packet includes a start field 310, address field 320, and a control field 330, data 340, a CRC field 350, and an end field 360, which the protocol for the wireless network defines. Start field 310 is typically a bit combination marking the start of the packet. Address field 320 indicates the address of the transmitter and is directed to the processing center. Control field 330 indicates the type of data packet. CRC field 350 is for error checking, and end field 360 indicates the end of the packet. The sending unit constructs data 340 to include fields for a location stamp 342, an address (not shown) for the receiver, and message content 344.

Figure 5:
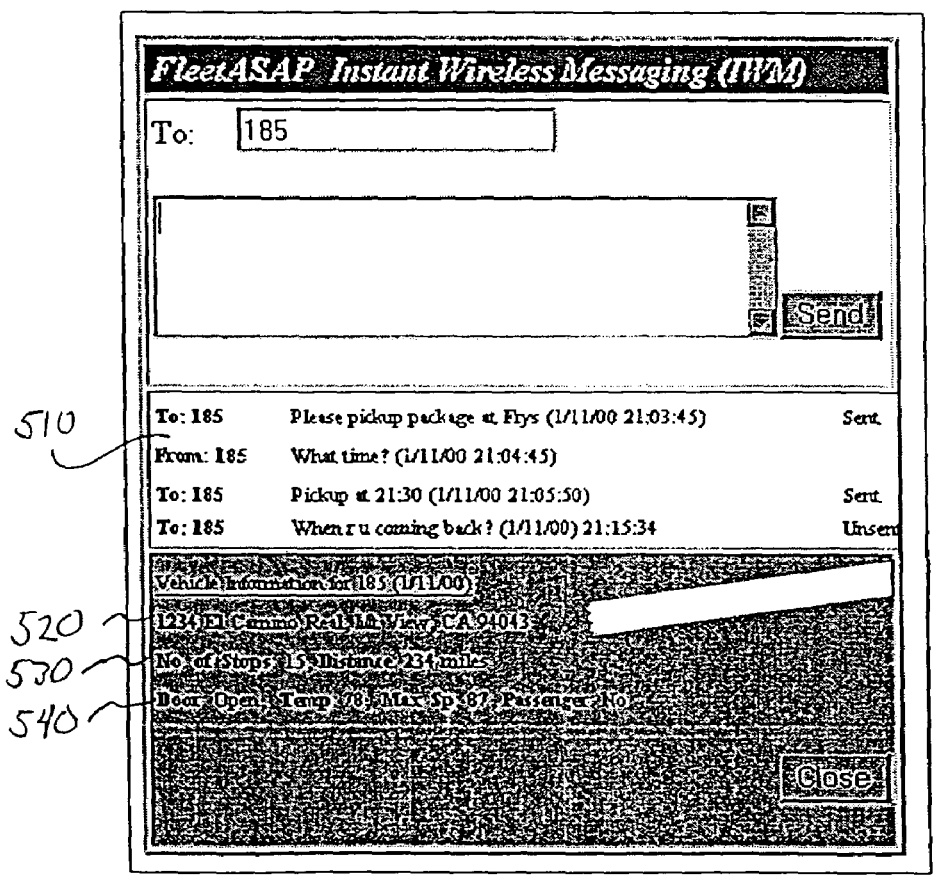
FIG. 5 shows a possible form of a received message including location information decoded from a location stamp.

FIG. 4 is a flow diagram of a process that a processing center performs when intercepting one or more message packet from a sending unit. When the processing center in a step 410 receives and collects one or more message packet of a message, processing center 170 in step 420 converts one or more location stamps into a form for the intended receiver. For example, processing center 170 performs geocoding to convert the longitude and latitude from the location stamp into a street address. Step 420 also combines the street address with the message content to create a message for the receiver. In step 430, the processing center provides the message to the receiver. In particular, if the receiver is connected to a web site of processing center 170, processing center 170 can transmit instant messages to the receiver using an interface such as shown in FIG. 5 to the receiver. Alternatively, processing center can send a message using telephone, pager, or other communication technology or can retain the message until the receiver accesses or contacts the processing center and requests messages.

FIG. 5 illustrates a user interface for instant messaging in accordance with an embodiment of the invention. In this embodiment, the receiver is a dispatcher or other party interested in monitoring or controlling movement of a fleet of vehicles. A mobile unit 185 (e.g., mobile unit 110, 120, or 130 of FIG. 1) and the receiver can send a series on instant messages 510 to each other. The receiver sees these messages 510 and location information 520 decoded from the location stamp in the last of the instant message. With the location information, which is automatically provided to the receiver, the receiver (e.g., the dispatcher) knows the location of the mobile unit 185 without the need to inquire about location. The dispatcher can use the location with route information 530 and vehicle status information 540 when giving instructions to the mobile unit 185 via the instant messages.

Although the invention has been described with reference to particular embodiments, the description is only an example of the invention's application and should not be taken as a limitation. For example, although several location-identification methods or devices are described, the location-identification technique employed is not critical to the invention, and embodiments of the invention can employ any location-identification that exists or may be developed. Various other adaptations and combinations of features of the embodiments disclosed are within the scope of the invention as defined by the following claims.

We claim:

1. A method of location authentication, the method comprising:

receiving a message from a mobile device wherein the mobile device is coupled with a control unit and a locating device, the message having significance independent of reporting a geographical location of the mobile device and the message having an automatically generated location stamp attached to an overhead portion of the message, the location stamp being a code incorporated within the message, the message comprising the location stamp having been intercepted and if needed converted into a format suitable to being received based on the capabilities of one or more of the following: a receiver receiving the message, the mobile device, a stationary unit, and a network service connection, the format suitable to being received being selected from a group of formats consisting of voice, image, and data signals, the location stamp indicating via the code a geographical location of the mobile device as an origin of the message, location information associated with the mobile device other than the origin of the message, and an identity of a sender of the message the location information selected from a group of location information consisting of longitude and latitude values, geographic information relative to a particular location, descriptive location information, and network information associated with the sender of the message, wherein the automatically generated location stamp is generated by the control unit automatically retrieving information from the locating device and attaching retrieved information in the form of the code to the message, and wherein the attaching is performed by the control unit before the message is transmitted;

validating the identity of the sender of the message based on the location stamp;

determining whether the code identified by the location stamp corresponds to at least one of the following: predetermined geographical location of the mobile device as an origin of the message, predetermined location information of the mobile device other than the origin of the message, and a predetermined identity of the sender, wherein the predetermined geographical location, the predetermined location information, and the predetermined identity of the sender is relevant to at least one action identified by the message, the at least one action comprising a charge to an account; and recording the following as proof that the charge to the account was authorized: the geographical location associated with the charge to the account and the location information associated with the charge to the account.

2. The method of claim 1, wherein utilizing the locating device to provide the geographical location further comprises:

utilizing the locating device to provide the geographical location using longitude and latitude values corresponding to the geographical location.

3. The method of claim 1, further comprising:

utilizing an application program associated with the mobile device to generate the message.

4. The method of claim 3, further comprising:

utilizing the application program to configure the message to further comprise a voice message.

5. The method of claim 3, further comprising:

utilizing the application program to configure the message to further comprise a text message.

6. The method of claim 1, further comprising:

transmitting the message from the mobile device to a receiving station.

7. The method of claim 6, further comprising:

intercepting the message at a processing center before the message reaches the receiving station; and converting the location stamp into a form suitable for the receiving station at the processing center.

8. The method of claim 1, further comprising:

receiving the message via a wireless communication system.

9. The method of claim 1, wherein determining whether the geographical location identified by the location stamp corresponds to a predetermined location relevant to at least one action identified from the message, the at least one action comprising a charge to an account, further comprises:

determining whether the geographical location identified by the location stamp corresponds to a predetermined location relevant to at least one action identified from the message, the at least one action comprising a charge to an account, wherein the at least one action further comprises a delivery.

10. The method of claim 1, wherein determining whether the geographical location identified by the location stamp corresponds to a predetermined location relevant to at least one action identified from the message, the at least one action comprising a charge to an account, further comprises:

determining whether the geographical location identified by the location stamp corresponds to a predetermined location relevant to at least one action identified from the message, the at least one action comprising a charge to an account, wherein the charge is a credit card charge.

11. A location authentication system comprising:

a receiver station configured to receive a message from a mobile device, wherein the mobile device is coupled with a control unit and a locating device, the message having a significance independent of reporting a geographical location of the mobile device and the message having an automatically generated location stamp attached to an overhead portion of the message, the location stamp being a code incorporated within the message, the message comprising the location stamp having been intercepted and if needed converted into a format suitable to being received based on the capabilities of one or more of the following: a receiver receiving the message, the mobile device, a stationary unit, and a network service connection, wherein the format suitable to being received is selected from a group of formats consisting of voice, image, and data signals, the location stamp indicating via the code a geographical location of the mobile device as an origin of the message, location information associated with the mobile device other than the origin of the message, and an identity of a sender of the message, the location information selected from a group of location information consisting of longitude and latitude values, geographic information relative to a particular location, descriptive location information, and network information associated with the sender of the message, wherein the automatically generated location stamp is generated by the control unit automatically retrieving information from the locating device and attaching retrieved information in the form of the code to the message, and wherein the attaching is performed by the control unit before the message is transmitted, and wherein the receiver station is configured to validate the identity of the sender of the message based on the location stamp and determine whether the code identified by the location stamp corresponds to at least one of the following: a predetermined geographical location of the mobile device as an origin of the message, predetermined location information of the mobile device other than the origin of the message, and a predetermined identity of the sender, wherein the predetermined geographical location, the predetermined location information and the predetermined identity of the sender is relevant to at least one action identified by the message, the at least one action comprising a charge to an account; and recording the following as proof that the charge to the account was authorized: the geographical location associated with the charge to the account and the location information associated with the charge to the account.

12. The system of claim 11, further comprising a global positioning satellite (GPS) system.

13. The system of claim 11, further comprising a wireless telephone system.

14. The system of claim 11, wherein the geographical location is expressed in terms of latitude and longitude values.

15. The system of claim 11, wherein the message includes a voice message from the sender.

16. The system of claim 11, wherein the message includes a text message that the sender entered.

17. The system of claim 11, further comprising a transmitter that conforms to a protocol of a wireless communication system.

18. The system of claim 11, wherein the at least one action further comprises a delivery.

19. The system of claim 11, wherein the charge is a credit card charge.

* * * * *